Patented Aug. 7, 1923.

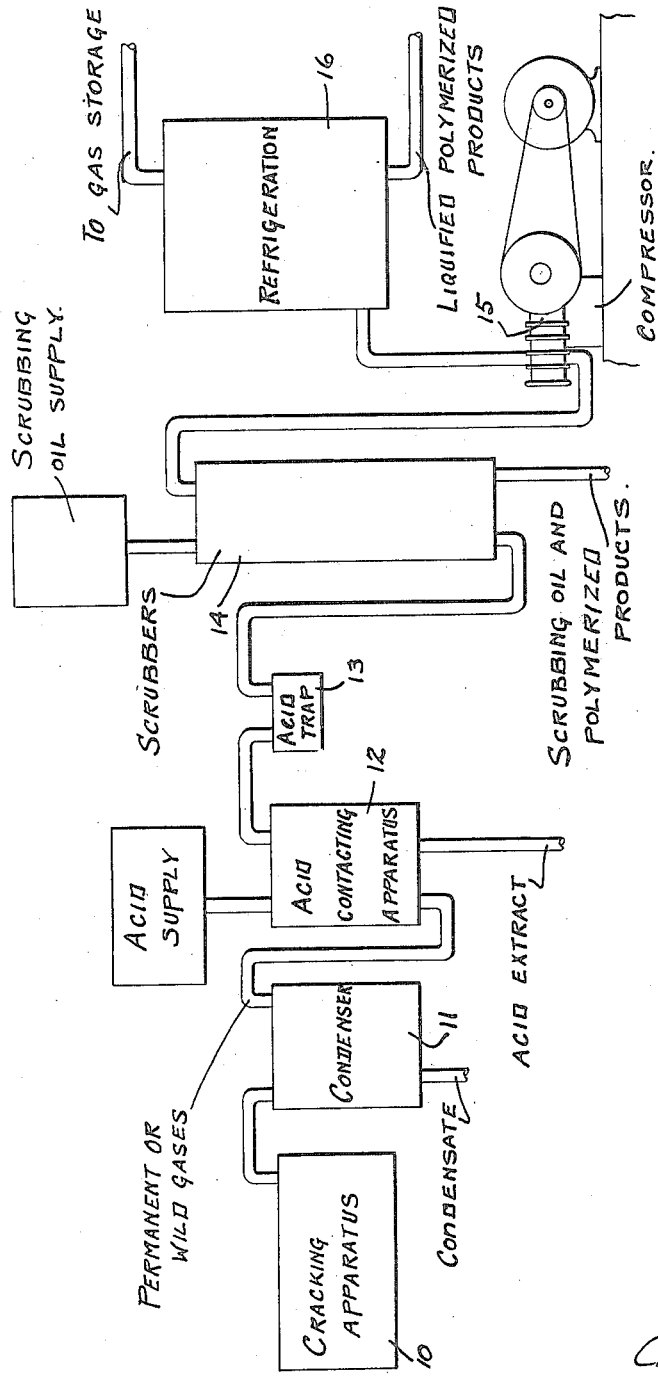

1,464,152

UNITED STATES PATENT OFFICE.

CARLETON ELLIS, OF MONTCLAIR, NEW JERSEY, ASSIGNOR, BY MESNE ASSIGNMENTS, TO SETH B. HUNT, OF MOUNT KISCO, NEW YORK, TRUSTEE.

PROCESS OF UTILIZING GASEOUS UNSATURATED HYDROCARBONS.

Application filed June 5, 1918. Serial No. 238,274.

*To all whom it may concern:*

Be it known that I, CARLETON ELLIS, a citizen of the United States, and a resident of Montclair, county of Essex, and State of New Jersey, have invented certain new and useful Improvements in Process of Utilizing Gaseous Unsaturated Hydrocarbons, of which the following is a specification.

This invention relates to the process of utilizing unsaturated hydrocarbons, and is applicable more especially to unsaturated hydrocarbons in the gaseous or vaporous state.

Gaseous or vaporous hydrocarbon material containing unsaturated hydrocarbons may be utilized for the purpose of the present invention, as, for example, the gases and vapors from petroleum cracking stills, and gases and vapors of shale oil and the like remaining after condensation of the liquid hydrocarbons, these gases and vapors, being hereinafter designated as "permanent" gases.

Such gaseous and vaporous materials are brought into and out of contact with an extracting or polymerizing agent, such, for example, as sulfuric acid, which may serve substantially the purposes of a catalyzer for polymerizing unsaturated hydrocarbons, producing generally higher boiling materials therefrom, and such polymerized materials, which accompany the escaping gases, are collected from the fixed gases, as, for example, by absorption in a suitable absorbent liquid or by compression under substantially high pressures with effective condensation, and in various other ways.

A variety of means may be resorted to for bringing the gases and vapors into and out of contact with a liquid extracting, polymerizing or catalyzing agent, such as sulfuric acid, as, for example, the sulfuric acid may be permitted to flow through a tower containing refractory material such as coke, gravel or the like, through which the gases and vapors are passed in the opposite direction, or the gases and vapors may be passed through a receptacle in which a body of sulfuric acid is kept in violent agitation, or contact with the acid substantially in the form of films and sprays may be obtained as by passing the gases and vapors through a beater or similar apparatus in which revolving blades are utilized to create substantially sprays or films of the acid, whereby extensive surface contact is obtained between the acid and the gases or vapors, and various other means may be resorted to for securing such extensive contact.

When sulfuric acid is given extensive contact with unsaturated hydrocarbons, such as unsaturated hydrocarbons present in the oil gases and vapors, in the foregoing or other ways, a considerable proportion of the unsaturated hydrocarbon material is extracted therefrom by the sulfuric acid or other extracting agent, and the character of the extract obtained varies in accordance with the conditions of extraction, as, for example, with some portions of the gases and vapors, if strong acids or high temperatures, or both, are used, considerable quantities of oils are formed which separate out from the acid extract on being permitted to stand, and, more especially, where lower temperatures and weaker acids, or both, are used, an extract may be obtained of such character as that mixtures of alcohols corresponding to unsaturated hydrocarbons, such as olefines, present in the oil gas may be obtained by hydrolysis. In general, the lighter the unsaturated components of the gases or vapors are, the higher the temperature and the stronger the acid which may be used for the production of acid extract adapted to give good yields of alcoholic materials.

The oil gases and vapors, after contacting with the relatively large quantities of sulfuric acid used, generally entrain more or less sulfuric acid therewith, and traps, scrubbers and the like may be resorted to for recovery of the entrained acid, whereby the loss thereof, as well as the contamination of the vapors or gases by sulfuric acid, may be substantially prevented. The acid so recovered usually contains more or less extracted or polymerized hydrocarbon material.

The production of acid extract from gases and vapors suitable for production of alcohols therefrom by hydrolysis and the production of oils separating out in liquid form from the acid extract do not constitute a part of the present invention, except as they are claimed herein in connection with the recovery of the valuable materials from the escaping gases and vapors now to be described.

The escaping gases may entrain or carry with them polymerized materials which are not retained by the sulfuric acid, including heavier gases and vapors formed from wild gases, for example, and light volatile liquid materials, such as naphtha, gasolene and the like.

According to the present invention provision is made for saving these valuable materials, as, for example, the gases, before being sent to the gas container for use for ordinary illuminating or fuel purposes, are preferably treated for the recovery of valuable materials of the general character referred to. This may be accomplished, for example, by passing the gases, after treatment with sulfuric acid, through an absorbing agent, such as anthracene oil, for example, from which the absorbed material may be recovered, as, for example, by fractional distillation, and the oil remaining after such recovered material is distilled therefrom may be reused for absorption of further quantities of such valuable materials. Various types of absorption apparatus, such as towers, scrubbers, &c., may be used for bringing the gases into extensive contact with the anthracene oil or other absorption material and to obtain efficent absorption.

The gases may be treated in various other ways, as, for example, they may be subjected to pressure and thoroughly refrigerated, whereby a quantity of light liquid material may be obtained which is useful as for blending with low grade gasolene to bring it up to the proper high standard, or the gases may be passed through light oil, such as gasolene, kerosene or the like, by which a considerable portion of the light material is absorbed or retained, or two or more of such modes for recovery of the valuable material carried by the escaping gases may be resorted to in succession if desired, or other suitable means may be taken for the recovery of such valuable material before the gases are sent to the gas condenser for burning.

An important field of application of the present invention is found in connection with the production of gasolene by cracking suitable material, such as heavy petroleum oils, for example. A draw-back of such cracking treatment is the production, in large quantities, of wild gas and light fixed gases which are a source of loss inasmuch as they can be utilized substantially only for burning purposes and are not readily transportable, as in the case of liquid hydrocarbon material. The present invention affords a means of saving important quantities of such materials which would otherwise be substantially lost, and operates, to an extent at least, to substantially perform the reverse of the cracking process so that substantial quantities of unsaturated hydrocarbon material, produced by cracking, as wild gas and the like, may be converted into heavier gases or into valuable liquid material, such as naphtha, gasolene, etc. and saved, and further, the material so obtained is of a light and highly volatile character and of great value because of its capacity, when added to or blended with heavy gasolene, for example, to produce substantially good quality and utilizable gasolene therefrom, or such materials may, of course, be made use of for other purposes requiring highly volatile material, such as a primer for internal combustion engines, for carburetting oils and for other purposes commanding relatively high prices.

It is, of course, common either to pass the gases and vapors, produced in cracking and which go through the condensers in such form, into absorbent oils and to subject such gases and vapors to pressure in gas compression apparatus, but so far as I am aware the gases and vapors so treated come substantially directly from the cracking stills to the absorption or compression apparatus and are not given the intermediate extraction or polymerizing treatment above described.

The present invention does not embrace the production of lubricating or other heavy oils by sulfuric acid polymerization, this being the subject of a co-pending application Serial No. 156,197, filed Mar. 20, 1917, to which I am a party but relates especially to the polymerization step involving the production of relatively volatile bodies such as gasolene, as set forth above.

The term "finely divided" referring to the sulphuric acid as used in the claims is intended to cover the treatment otherwise referred to as "into and out of contact with sulphuric acid." The treatments thus variously covered are such as are set forth in the fifth paragraph of the specification.

While sulphuric acid has been used in the claims as an example of a polymerizing agent which may be used in these processes, it is to be understood that other polymerizing agents may be used in place of the sulphuric acid.

The accompanying drawing is a diagrammatical illustration of one mode of carrying out the invention. The permanent or wild gases from cracking operations carried on in the cracking apparatus 10 and remaining uncondensed in condenser 11, are brought into and out of contact with sulfuric acid in the acid contacting apparatus 12, and after passing through an acid trap 13, are scrubbed in scrubbers, as 14, removing polymerized products of olefines, after which the gases are compressed in compressor 15 and additional liquefiable polymerized products are obtained by compression and refrigeration in refrigerating apparatus 16, whence the remaining permanent gases pass to the gas holders.

I claim:

1. The process of producing light, volatile oils which comprises contacting gaseous or vaporous hydrocarbon material containing unsaturated hydrocarbons with large quantities of finely divided sulphuric acid whereby polymerization is effected to produce light, volatile oils.

2. The process of producing light volatile oils which comprises bringing gaseous or vaporous hydrocarbon material containing unsaturated hydrocarbons into contact with finely divided sulphuric acid whereby polymerization is effected to produce light, volatile oils, and then recovering the liquid, polymerized hydrocarbons from the gases and vapors subsequent to such contact.

3. The process of producing light, volatile oils which comprises bringing permanently gaseous and vaporous hydrocarbons containing unsaturated hydrocarbons into contact with finely divided sulphuric acid whereby polymerization is effected to produce light, volatile oils and subjecting the gases and vapors so treated to the action of an absorbing agent.

4. The process of producing light, volatile oils which comprises bringing vapors or gases from cracking stills into contact with finely divided sulphuric acid whereby polymerization is effected to produce light volatile oils, and then subjecting the gases and vapors after treatment with sulphuric acid, to condensation under pressure for recovery of materials adapted thereby to be converted into liquid form.

5. The process of producing light, volatile liquid hydrocarbon material which comprises bringing permanent oil gases and vapors from cracking stills into contact with finely divided sulphuric acid whereby polymerization is effected to produce light, volatile liquid hydrocarbon material, and then collecting and recovering the polymerized material from the gases and vapors.

6. The process of producing light, volatile liquid hydrocarbon material which consists in bringing permanently gaseous hydrocarbons comprising unsaturated hydrocarbons into contact with finely divided sulphuric acid, whereby polymerization of unsaturated hydrocarbons is effected to produce light, volatile liquid hydrocarbon material and then subjecting the hydrocarbons to the action of an absorbing agent and to condensation under pressure.

In testimony that I claim the foregoing, I have hereto set my hand, this 1st day of June, 1918.

CARLETON ELLIS.